US010062289B2

(12) United States Patent
Arndt et al.

(10) Patent No.: US 10,062,289 B2
(45) Date of Patent: Aug. 28, 2018

(54) DEVICE AND METHOD FOR ASSISTING A DRIVER IN DRIVING HIS VEHICLE INTO AND OUT OF A PARKING SPACE IN A PARKING FACILITY

(71) Applicant: FORD GLOBAL TECHNOLOGIES, LLC, Dearborn, MI (US)

(72) Inventors: Christoph Arndt, Moerlen (DE); Uwe Gussen, Huertgenwald (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 14/903,877

(22) PCT Filed: Jun. 24, 2014

(86) PCT No.: PCT/EP2014/063294
§ 371 (c)(1),
(2) Date: Jan. 8, 2016

(87) PCT Pub. No.: WO2015/003899
PCT Pub. Date: Jan. 15, 2015

(65) Prior Publication Data

US 2016/0371982 A1 Dec. 22, 2016

(30) Foreign Application Priority Data

Jul. 9, 2013 (DE) ........................ 10 2013 213 379

(51) Int. Cl.
*G01C 21/00* (2006.01)
*G08G 1/16* (2006.01)
(Continued)

(52) U.S. Cl.
CPC ............. *G08G 1/168* (2013.01); *G07B 15/02* (2013.01); *G08G 1/096811* (2013.01);
(Continued)

(58) Field of Classification Search
CPC .... G08G 1/14; G08G 1/168; G08G 1/096844; G08G 1/143; G08G 1/146; G08G 1/166; G07B 15/02
(Continued)

(56) References Cited

U.S. PATENT DOCUMENTS 6,771,185 B1 * 8/2004 Yoo .................... G06Q 30/0284 340/525
6,885,312 B1 4/2005 Kirkpatrick
(Continued)

FOREIGN PATENT DOCUMENTS

DE 102008018186 A1 10/2009
DE 102009057647 A1 12/2009
(Continued)

OTHER PUBLICATIONS

International Search Report for corresponding PCT Application No. PCT/EP2014/063294, dated Oct. 20, 2014, 11 pgs.

*Primary Examiner* — Gertrude Arthur Jeanglaude
(74) *Attorney, Agent, or Firm* — Frank A. MacKenzie; Brooks Kushman P.C.

(57) ABSTRACT

A device and method for assisting a driver when parking his vehicle in a parking installation and removing his vehicle therefrom is provided. The vehicle is equipped with a driving assistance system which permits remote-controlled movement and steering. The device has a parking management and monitoring apparatus which is configured to determine, at the start of a parking phase, a first route for a vehicle, which has been left behind by the driver in an entry region of the parking installation, to a currently available free parking space within the parking installation, and transmit corresponding movement instructions to the driving assistance system of the vehicle, and determine, at the end of the parking phase, a second route for the vehicle from this parking space to an exit region of the parking installation,
(Continued)

and transmit corresponding movement instructions to the driving assistance system of the vehicle.

15 Claims, 5 Drawing Sheets

(51) Int. Cl.
*G08G 1/14* (2006.01)
*G07B 15/02* (2011.01)
*G08G 1/0968* (2006.01)

(52) U.S. Cl.
CPC ....... *G08G 1/096844* (2013.01); *G08G 1/143* (2013.01); *G08G 1/146* (2013.01); *G08G 1/166* (2013.01)

(58) Field of Classification Search
USPC ............................... 701/117, 414; 340/932.2
See application file for complete search history.

(56) References Cited

U.S. PATENT DOCUMENTS

| | | | | |
|---|---|---|---|---|
| 8,169,341 | B2 | 5/2012 | Toledo et al. | |
| 8,723,689 | B2 * | 5/2014 | Mimeault | G08G 1/04 340/932.2 |
| 2005/0096974 | A1 | 5/2005 | Chagoly et al. | |
| 2009/0207045 | A1 | 8/2009 | Jung | |
| 2010/0156671 | A1 | 6/2010 | Lee et al. | |
| 2010/0156672 | A1 | 6/2010 | Yoo et al. | |
| 2011/0205088 | A1 | 8/2011 | Baker | |
| 2012/0188100 | A1 | 7/2012 | Min et al. | |
| 2012/0245981 | A1 | 9/2012 | Volz | |
| 2013/0325565 | A1 | 12/2013 | Toussaint | |
| 2015/0369618 | A1 * | 12/2015 | Barnard | H05B 37/0272 701/491 |

FOREIGN PATENT DOCUMENTS

| | | | |
|---|---|---|---|
| DE | 102009041587 | A1 | 3/2011 |
| EP | 1408455 | A3 | 10/2002 |
| EP | 2316709 | A2 | 5/2011 |

* cited by examiner

DEVICE AND METHOD FOR ASSISTING A DRIVER IN DRIVING HIS VEHICLE INTO AND OUT OF A PARKING SPACE IN A PARKING FACILITY

CROSS-REFERENCE TO RELATED APPLICATIONS

This application is the National Stage of International Application No. PCT/EP2014/063294, filed Jun. 24, 2014, which claims priority to DE Patent Application No. 10 2013 213 379.0, filed Jul. 9, 2013, the disclosures of which are incorporated in their entirety by reference herein.

The invention relates to a device and a method for assisting a driver when parking his vehicle in a parking installation such as a multistory car park, an underground garage or the like and removing his vehicle therefrom.

Parking in public parking installations such as multistory car parks or underground garages is frequently time-consuming and laborious, wherein in addition adverse environmental influences result from the fact that a suitable parking space is not always directly available, which is the case, in particular, when there is a high traffic volume and a high utilization rate of the multistory car park. The resulting lines of vehicles increase the waiting time for the driver who, after finding a suitable parking space, also still requires some time to find, on the one hand, steps or elevators and, on the other hand, also to return to his vehicle later. The associated prolonged stay can have an adverse effect on health owing to the poor air quality and also the restricted environment, wherein extensive walkways, for example in an underground garage, can be extremely demanding and stressful for pregnant women and for elderly people or persons with restricted mobility. In addition, in particular at night a walkway often entails risks, for example of mugging, as a result of an underground garage which is otherwise empty of people.

EP 2 316 709 A2 discloses a motor vehicle having an assigned external control device, wherein the control device at the motor vehicle end additionally takes into account location information about the stopping location of the driver and/or a destination which is predefined by the driver, with the result that the driver influences the process of removing his car by means of his stopping location and/or the destination, as a result of which more targeted automatic parking processes can be implemented.

DE 10 2009 041 587 A1 discloses a driver assistance apparatus for a motor vehicle, wherein images of the surrounding area of the motor vehicle are displayed to the driver on a display apparatus of a portable remote control system, with the result that the driver can see all the objects located in the surrounding area of the motor vehicle and, if appropriate, can interrupt the autonomous parking process if a hazardous situation comes about.

An object of the present invention is to make available a device and a method for assisting a driver when parking a vehicle in a parking installation and removing a vehicle therefrom, which device and method permit further automation of the desired parking processes.

This object is achieved by means of the device according to the features of independent patent claim 1 and the method according to the features of coordinate patent claim 8.

A device for assisting a driver when parking his vehicle in a parking installation such as a multistory car park, an underground garage or the like and removing his vehicle therefrom, wherein the vehicle is equipped with a driving assistance system which permits remote-controlled movement and steering, has a parking management and monitoring apparatus which is configured to carry out the following steps:

- determining, at the start of a parking phase, a first route for a vehicle, which has been left behind by the driver in an entry region of the parking installation, to a currently available free parking space within the parking installation, and transmitting corresponding movement instructions to the driving assistance system of the vehicle; and
- determining, at the end of the parking phase, a second route for the vehicle from this parking space to an exit region of the parking installation, and transmitting corresponding movement instructions to the driving assistance system of the vehicle;
- wherein the determination of the first route and of the second route by the parking management and monitoring apparatus is carried out in each case by monitoring further vehicles moving within the parking installation.

According to the invention, it is, in particular, made possible for a driver to leave his vehicle, for example, in the entry area of a multistory car park and, after he has run his errands, to pick it up again later as required. In the intermediate time, the control of the vehicle is assumed by the infrastructure of the parking installation or an operator monitoring this infrastructure, wherein the vehicle is parked in a suitable parking space of the parking installation (for example of the multistory car park or underground garage).

In this context, it is assumed here and below that the respective motor vehicle is equipped with a suitable remote-controlled driving assistance system which permits remote-controlled movement and steering.

As a result of the invention, in addition to optimizing the utilization of the available parking space it is also possible to ensure that the driver does not waste any further time with the parking or removal of the vehicle. Furthermore, increased personal safety is achieved in the utilization of the parking installation at any time of day. The utilization of a multistory car park or an underground garage with multiple floors is simplified significantly, in particular for persons with restricted mobility, elderly persons, etc.

A further advantage is the reduction in the risk of damage to vehicles during the parking process. By virtue of the fact that the driver is no longer obliged to walk along relatively long walkways within the multistory car park or the underground garage to park and pick up his vehicle, he is additionally subjected to a lesser degree to poor air conditions, restricted ambient conditions and possible safety risks. Overall, the invention permits more effective utilization of existing parking assistance apparatuses in terms of the autonomous execution of parking processes and vehicle removal processes as well as the provision of a relatively large number of parking spaces within the parking installation owing to the reduction or the elimination of required installations such as steps, elevators, etc.

According to one embodiment, the device has a sensor arrangement which is configured to carry out real-time monitoring of vehicles moving within the parking installation and to transmit corresponding sensor data to the parking management and monitoring apparatus.

According to one embodiment, the sensor arrangement is also configured to carry out real-time monitoring of parking spaces which are available within the parking installation and to transmit corresponding sensor data to the parking management and monitoring apparatus.

According to one embodiment, the parking management and monitoring apparatus is configured to communicate with the driving assistance system of the vehicle by means of wireless data communication.

According to one embodiment, the parking management and monitoring apparatus is also configured to carry out wireless data communication with at least one operator. In this context, information about the state of the parking installation can be transmitted such as, for example, the duration of the parking, the residual parking time, the opening and closing times of the parking installation, etc.

According to one embodiment, the parking management and monitoring apparatus is also configured to estimate the time of return of the driver to the parking installation.

According to one embodiment, the parking management and monitoring apparatus is also configured to calculate the costs for the utilization of the parking installation.

The invention also relates to a method for assisting a driver when parking his vehicle in a parking installation such as a multistory car park, an underground garage or the like and removing his vehicle therefrom. With respect to preferred refinements and advantages of the method, reference is made to the statements above relating to the device according to the invention.

Further refinements of the invention can be found in the description and the dependent claims. The invention is explained in more detail below by means of exemplary embodiments illustrated in the appended figures, of which:

Figure 1:
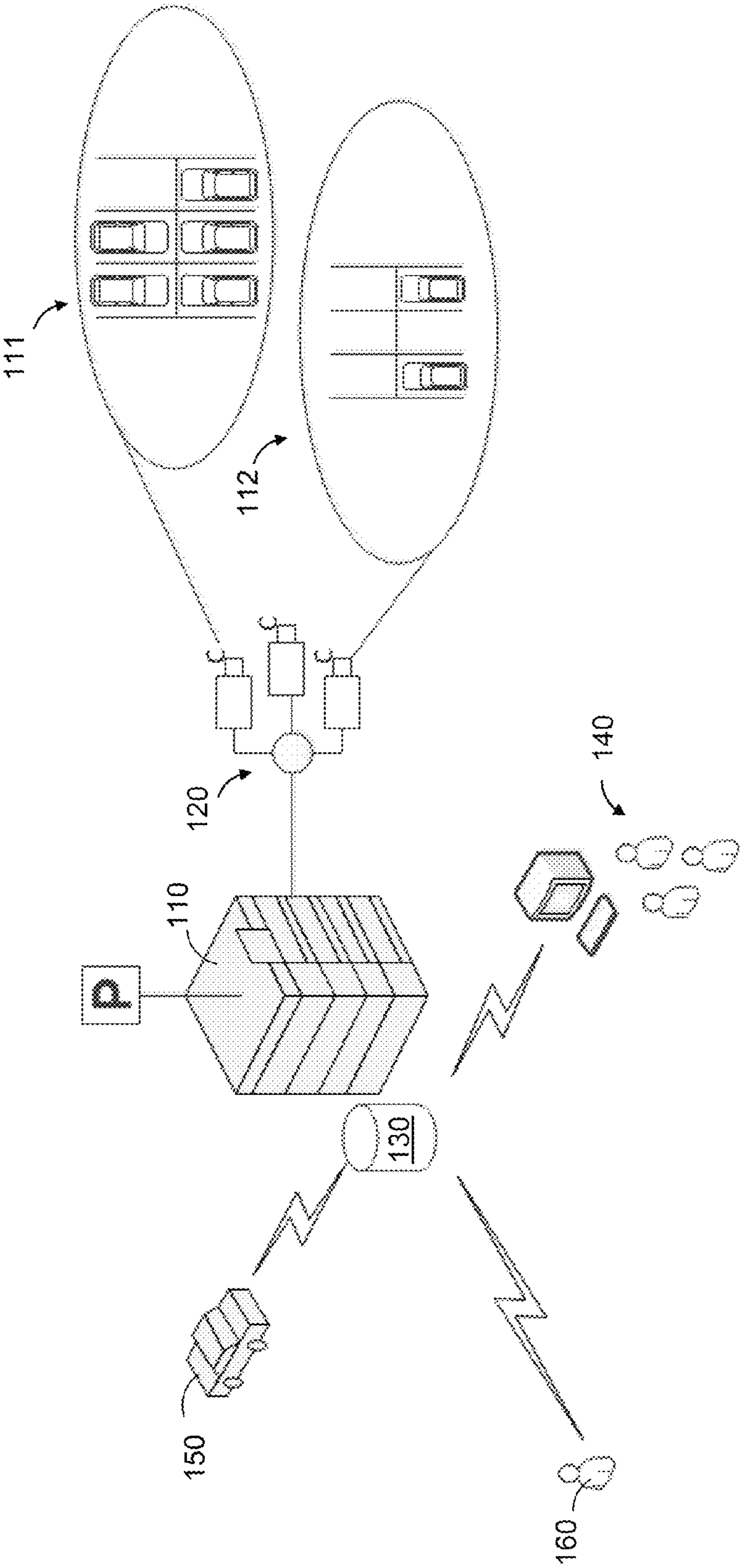
FIG. 1 shows a schematic overview diagram explaining the components of a device according to an embodiment of the invention.

FIG. 1 shows a schematic overview diagram of the essential components of the device according to the invention. A parking installation, for example in the form of a multistory car park or an underground garage, is denoted by "110", wherein the parking spaces and the different entry areas within the parking installation 110 are monitored by means of a sensor arrangement 120. The sensor arrangement 120 permits real-time monitoring of vehicles which move into and away from specific parking spaces, and also permits the monitoring of the number, location and dimensions of available parking spaces. Two areas 111, 112 within the parking installation 110 are illustrated merely by way of example, wherein one free parking space is available in the area 111, and four free parking spaces are available within the area 112.

A central parking management and monitoring apparatus is denoted by "130" in FIG. 1, the function of said central parking management and monitoring apparatus being, inter alia, to receive and to collect the data measured by the sensor arrangement 120. Furthermore, data communication with, or remote control of, at least one vehicle 150 which is to be parked or removed takes place by means of the central parking management and monitoring apparatus 130 by means of wireless data transmission, in order to move the vehicle 150 through the parking installation 110. In addition, communication with operators 140 can optionally also occur by means of the central parking management and monitoring apparatus 130. Further functions which can be perceived by the central parking management and monitoring apparatus 130 include the identification of the respective driver, estimation of when said driver will return to his vehicle 150, and calculation of the costs for the utilization of the respective parking space.

The operators 140 can either monitor the fully automated central parking management and monitoring apparatus 130 or else (for example in an emergency or in the case of a system overload) can assume partial or complete control of the automated system. The operators 140 can be located in the parking installation 110 itself or at a more remote location from where said operators can communicate with the parking management and monitoring apparatus 130 by means of wireless data communication.

The vehicle 150 is equipped with a driving assistance system which permits remote-controlled movement and steering through the parking installation 110 (for example the underground garage). In this context, the driver 160 of the vehicle 150 can be located within or else outside his vehicle 150 during the parking process.

According to the invention, a driver 160 can leave the vehicle 150 at an entrance of the parking installation 110 and also receive it again later. If the driver 160 is on a return path to the parking installation 110, this can be sensed by means of the parking management and monitoring apparatus 130 by means of GPS coordinates. If the driver 160 is located in the direct vicinity of the parking installation 110 (that is to say for example is only less than a minute away), the respective vehicle 150 can be moved automatically and under remote control to the closest exit. If the driver 160 changes his plans for whatever reason (for example because he has forgotten an errand or a visit), the parking maneuver can be aborted at any time and the vehicle 150 is returned to the nearest available parking space.

In the text which follows, an exemplary sequence of the method according to the invention will be explained with reference to the flowchart shown in FIG. 2. In this context, the central parking management and monitoring apparatus 130 from FIG. 1 will be referred to below in an abbreviated form as PMS (="Parking Management and Monitoring System"). In the manner illustrated in FIG. 2, a plurality of vehicles can also be monitored and processed in parallel.

In the step S201, the PMS 130 monitors whether vehicles are approaching the parking installation 110. If this is the case according to the interrogation in step S202, in step S203 the driver 160 of the vehicle 150 is informed and asked (step S204) whether he would like to park the vehicle 150. In this context, further information can be transmitted at the same time, for example the number of available parking spaces, the price for the utilization of the parking spaces, etc.

If the driver 160 confirms the parking request, the PMS 140 sends back a confirmation (step S205) and prepares the parking process of the vehicle 150. In step S205*a*, the driver 160 can optionally implement different configurations or provide different information for the PMS 130. For example, the driver 160 can predefine or program a fixed end time for the parking. The driver 160 can also predefine or program at which exit of the parking installation 110 he would like to pick up the vehicle 150. Furthermore, the driver can also predefine the passenger compartment temperature which the vehicle 150 is to have after the expiry of the duration of the parking time. The driver 160 can also predefine information indicating that his electric vehicle requires a specific space for charging the battery, or else that it does not require such a space (if the battery is completely charged). The driver 160 can also request certain maintenance measures during the parking time, for example the checking of the tire pressure, in which case the PMS 130 makes contact with the maintenance personnel and directs them to the parked vehicle 150. Furthermore, the driver 160 can predefine that he would like to remain in the vehicle 150, since he, for example, wishes to find a room within the same building. In this case, the PMS 130 can suggest a parking space in the vicinity of the suitable exit for the driver 160.

In the step S206, the system then determines dimensions and certain properties of the vehicle 150 (for example electric vehicle, relevant driver settings for selecting a suitable parking space, etc.). The PMS 130 then carries out the determination on the basis of the current utilization rate of the parking installation 110, of the traffic volume and, if appropriate, of certain features or properties of a suitable parking space within the parking installation 110 which have been determined in the preceding step S206, while minimizing the expenditure of energy and costs for the vehicle (step S207).

The PMS 130 subsequently processes (step S208) the route from the entrance to the parking installation 110 (where the vehicle to be parked is currently located) to the selected parking space which was determined in step S207. This route is specified as a list of different coordinates or check points which the vehicle 150 is to pass through in order to reach the final parking position. Check points can be any desired locations within the parking installation 110 (cf. FIG. 3). It is possible here for a vehicle 150 to be guided step by step between certain check points along or within the parking installation.

Figure 3:
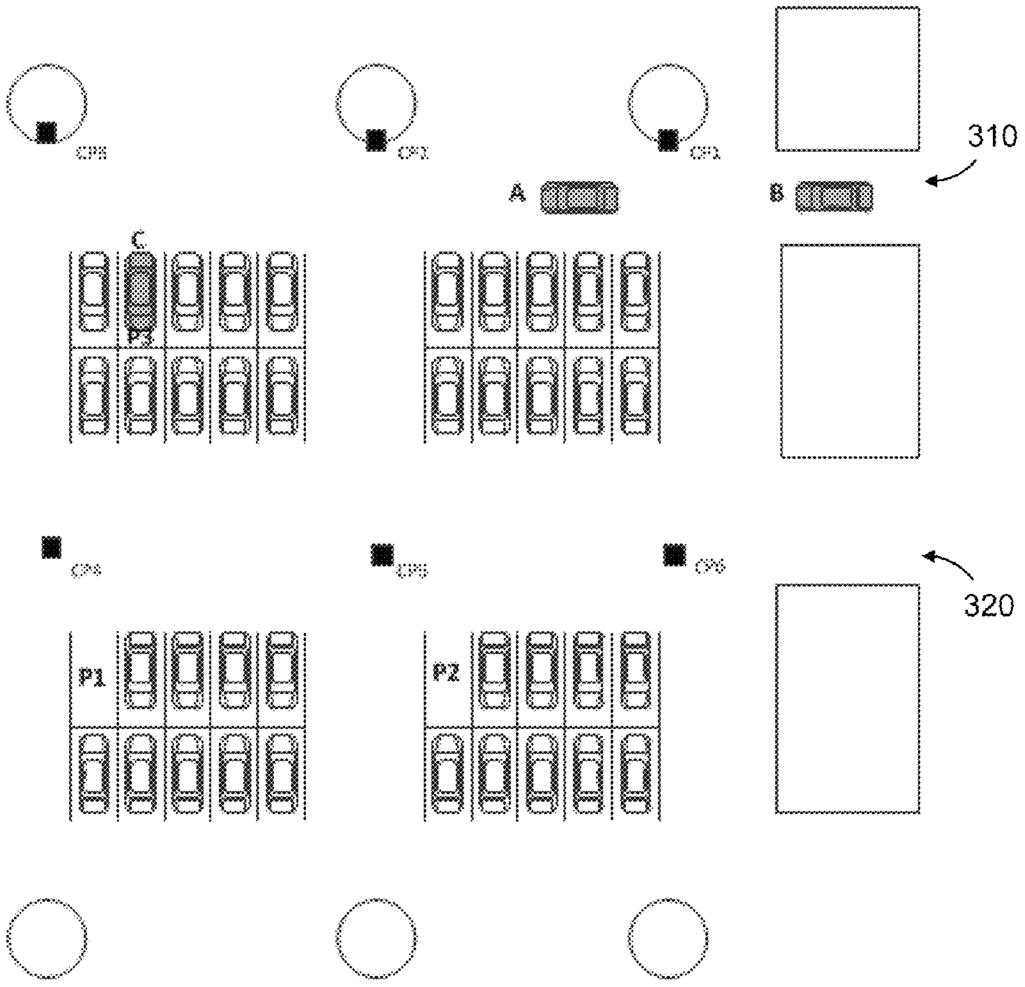

According to FIG. 3, for example a vehicle "A" is firstly driven into the parking installation 110, wherein the best parking space for the vehicle A taking into account the expenditure of energy is the parking space "P1", with the result that the route {entrance, CP1, CP2, CP3, CP4, P1} is identified as the planned route for the vehicle A.

In step S209, the PMS 130 plans the route of the vehicle as a function of the current traffic volume in the parking installation 110 (i.e. taking into account other vehicles which are currently being remote-controlled by the PMS 130). All the vehicles should be moved from one check point to the other without disrupting one another or slowing one another down. In this context, a list of functions can be displayed in which the PMS 130 enters a priority and route section for each vehicle.

According to FIG. 3, for example the vehicle B drives into the parking installation 110, while the vehicle A is guided under remote control to the parking space P1. The vehicle B should be guided to the parking space P2, since at present there is no other parking space available. The planned route for the vehicle B is {entrance, CP1, CP2, CP3, CP4, CP5, P2}. The functions planned for the vehicle A and the vehicle B by the PMS 130 can be constituted, for example, as illustrated in the following Table 1:

TABLE 1

| | |
|---|---|
| 1 | Move vehicle A to CP1 |
| 2 | Move vehicle A to CP2 |
| 3 | Move vehicle B to CP1 |
| 4 | Move vehicle A to CP3 |
| . . . | . . . |
| 8 | Move vehicle A to P1 |
| 9 | Move vehicle B to CP5 |
| 10 | Move vehicle B to P2 |

A situation can then occur in which during the movement of the vehicle A from the check point CP2 to the check point CP3 and during the movement of the vehicle B to the check point CP1 (functions 3 and 4), the parking time of the further vehicle C is exceeded and the driver thereof will shortly arrive at the exit of the parking installation 110. The vehicle C must therefore be moved to the exit. The route of vehicle C is {P3, CP3, CP4, CP5, CP6, exit}. This means that the parking space P3 for the vehicle B becomes free if the movement of the vehicle B is briefly stopped in order to permit the vehicle C to be removed from the parking space. The planned function list can then be modified according to Table 2 as follows:

TABLE 2

| | |
|---|---|
| 1 | Move vehicle A to CP1 |
| 2 | Move vehicle A to CP2 |
| 3 | Move vehicle B to CP1 |
| 4 | Move vehicle A to CP3 |
| 5 | Move vehicle A to CP4 |
| 6 | Stop vehicle B at CP1 |
| 7 | Move vehicle C to CP3 |
| 8 | Move vehicle A to CP4 |
| 9 | Move vehicle B to CP2 |
| 10 | Move vehicle A to P1 |
| 11 | Move vehicle C to CP4 |
| 12 | Move vehicle B to P3 |
| 13 | Move vehicle C to the exit |

In this context, in the extreme case situations are conceivable in which a multiplicity of vehicles which are to be parked within the same parking installation 110 are present, wherein the PMS 130 forms a column of vehicles which are directed to remote parking spaces, in order to clear the entrance to the parking installation 110 quickly. In such a column of vehicles, only the first vehicle receives parking instructions from the PMS 130, while the other vehicles follow their respective preceding vehicle.

In step S210, the PMS 130 translates the prioritized and defined functions into movement instructions for the respective driving assistance system of the vehicle to be parked. For example, the first instruction of the preceding function list "Move vehicle A to CP1" can be translated into a group of instructions which are transmitted to the vehicle 150 as follows:

a) steering wheel angle 0°
b) engage gear
c) release brake
d) activate gas pedal and release clutch pedal in order to maintain a vehicle speed of less than 15 km/h
e) move vehicle by 50 m or until proximity of CP1 is sensed or until GPS coordinates XXX, YYY, . . . are sensed.

According to an optional step S207*a*, an operator can also partially or completely jump over the steps S207 to S210 or omit the respective step (wherein the operator is given priority in each case). For example, the operator can cancel the selected parking space for the vehicle 150 and modify the route processed by the PMS 130, etc.

In step S211, the PMS 130 monitors whether the vehicle 150 is ready to carry out the parking maneuver. The exiting of a vehicle by the driver is typically an indication that the parking maneuver can start, wherein otherwise confirmation by the driver 160 can be sent to the PMS 130. The driver 160 can remain in his vehicle 150 during the parking maneuver, wherein, if appropriate, he can also drive the vehicle himself by in this respect deactivating the PMS 130 or receiving priority to do so.

If the vehicle 150 is ready to start the parking process, the movement instructions processed beforehand in step S210 are transmitted to the vehicle 150 (either simultaneously or else step by step).

The remote control of the vehicle 150 from the entrance of the parking installation 110 to the selected parking space can take place in an open loop, a closed loop or a combination of both: in the case of an open loop all the movement instructions or a group of movement instructions are transmitted to the vehicle 150. Only the final position of the vehicle 150 is monitored by the PMS 130. Interactions with other vehicles continue to be the responsibility of the driving assistance system of the vehicle 150 to be parked. Such an exemplary embodiment can be selected, for example, if there is no traffic, or very free flowing traffic, within the parking installation 110. Such an exemplary embodiment can also be selected if the driver 160 remains in the vehicle 150 during the parking maneuver and, optionally, can assume control. In the case of the closed loop, the movement instructions are transmitted step by step to the vehicle 150. The respectively subsequent instruction is transmitted only if the vehicle 150 has carried out the preceding instruction. The PMS 130 checks at the end of each step whether the vehicle 150 has reached the correct position. This embodiment variant is preferred if the traffic density in the parking installation 110 is higher and if the driver 160 does not remain in the vehicle 150.

As soon as the PMS 130 has transmitted instructions to the vehicle 150, interruptions and changes are monitored. Interruptions can be brought about by an operator or by the system itself if (for example in the case of a traffic jam, in an emergency, in the case of a system overload or owing to deactivation by an operator) it is decided to abort the current parking process. If such interruptions or changes occur, the route of the vehicle 150 is processed anew (i.e. a return to step S207 occurs).

In step S215, the vehicle 150 has reached the assigned parking space and has been parked if no changes or interruptions have occurred and if all the movement instructions have been transmitted from the PMS 130 to the vehicle 150 and executed thereby. In step S216, the vehicle 150 is then switched off and/or goes into an energy-saving mode (switching off, standby, etc.).

Figure 4:
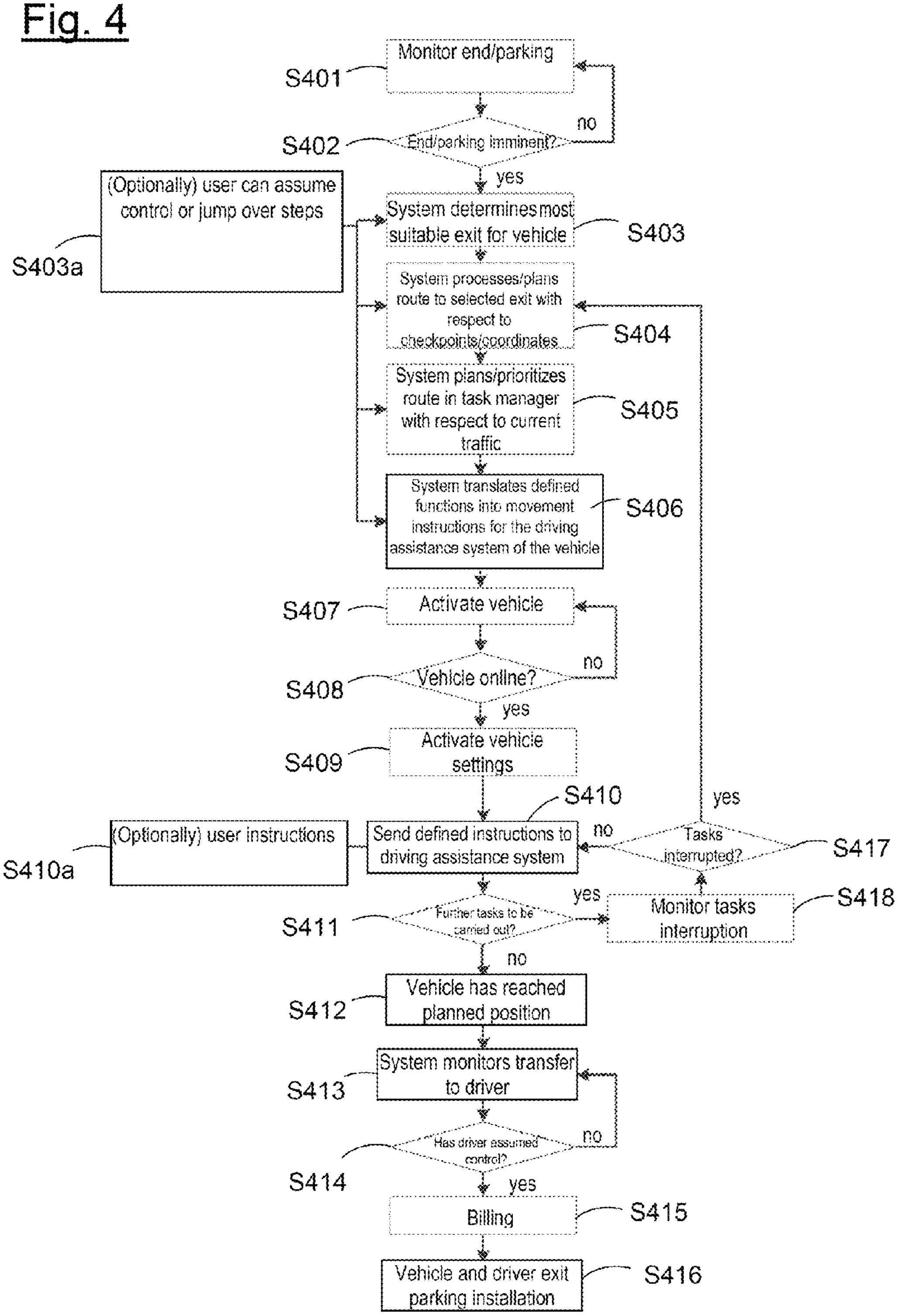
FIGS. 4-5 show flowcharts for explaining the sequence of a method according to the invention in further embodiments.

A possible maneuver for removing the vehicle according to the present invention is described below with reference to the flowchart illustrated in FIG. 4.

In step S401, the PMS 130 checks whether the parking phase of the vehicle 150 is ending, wherein various criteria can be used: for example a predefined duration of time may have expired, the driver 160 may be returning to the parking installation 110 and may be located in the vicinity of one of the exits (for example with an estimated remaining time of less than 1 minute until arrival). In this case, the position of the driver can be determined by means of GPS coordinates and by means of a PDA device of the driver 160 which is in communication with the PMS 130. If the driver 160 is located within a predefined radius around the parking installation 110, it can be assumed that the driver 160 is returning. Furthermore, a signal which is transmitted to the PMS 130 by the driver 160 can serve as a criterion for the imminent sequence of the parking phase (S402).

Figure 2:
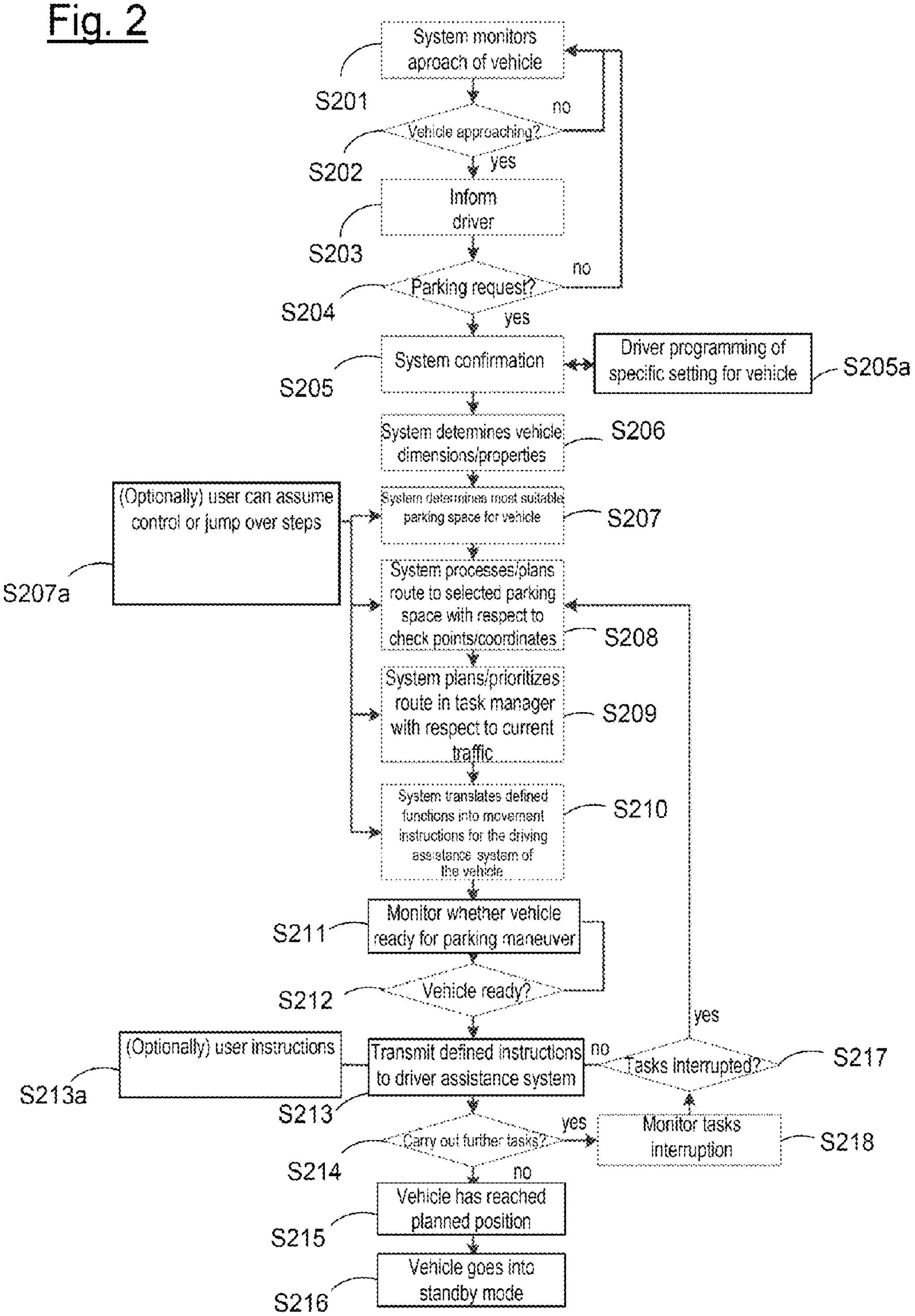
FIGS. 2-3 show a flowchart (FIG. 2) or a schematic illustration (FIG. 3) for explaining the sequence of a method according to the invention in an embodiment.

The further steps S403 to S406 are essentially analogous to the steps S207 to S210 in FIG. 2, wherein an exit of the parking installation 110 now takes the place of the "parking space".

In step S407, the vehicle 150 is activated again and started in order to prepare the maneuver for removing the vehicle. If according to the interrogation in the subsequent step S408, the vehicle 150 is online, certain vehicle settings and configurations (which have been programmed, for example, in the step S205*a* mentioned with reference to FIG. 2) are loaded into the vehicle 150 in the (optional) step S409.

The steps S410 to S412 are essentially analogous to the steps S213 to S215 according to FIG. 2, wherein here an interruption or exception in the case of a change in a decision by the driver 160 can additionally be provided. If, for example, the driver 160 is returning to the parking installation 110 and has already confirmed his intention to receive the vehicle 150, the vehicle 150 is already moved under remote control in the direction of an exit of the parking installation 110 and the driver 160 then decides, for whatever reason (for example because he has forgotten something) to postpone returning to the vehicle 150, the maneuver for removing the vehicle is aborted and a new route to the next parking space is planned.

If the vehicle 150 has reached its planned position (step S412), in the step S413 the transfer to the driver 160 is monitored by the PMS 130. If the driver 160 has, according to the interrogation in step S414, assumed control of his vehicle 150 (for example by getting into the vehicle 150 or confirming a corresponding interrogation), according to step S415 the billing of the parking fees for the precise duration of the parking phase can be carried out. For this purpose, a method for authenticating the driver and for connecting to a payment organization is necessary. Step S416 denotes the end of the parking process and the communication with the PMS 130, wherein the vehicle 150 and driver 160 exit the parking installation 110.

Figure 5:
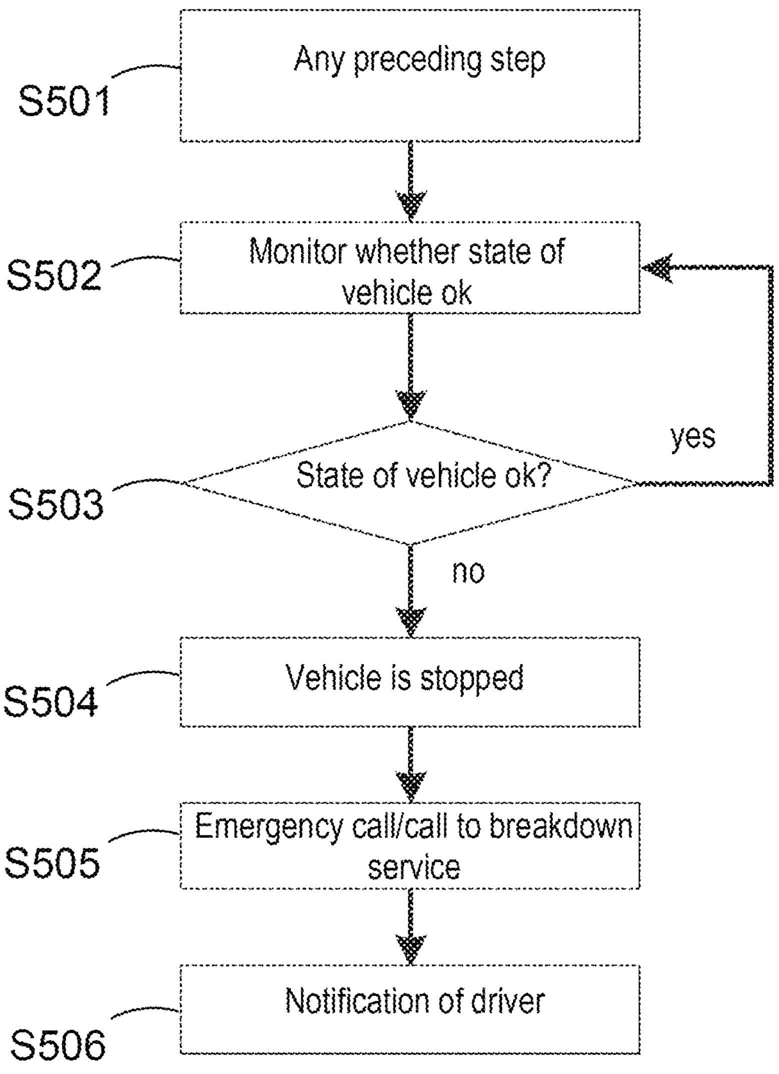

FIG. 5 shows a sequence of method steps which are carried out by the PMS 130 according to one embodiment in the event a vehicle 150 no longer being controllable owing to a random system error (for example engine fault). This procedure occurs in parallel with the superordinate monitoring procedure, wherein a transfer to the procedure of any of the steps S201-S216 from FIG. 2 or S401-S417 from FIG. 4 can occur, as is indicated by step S501.

In the step S502 it is monitored whether the state of the vehicle is satisfactory or whether messages about a malfunction are present. If, according to the interrogation in step S503, a message about a malfunction or about any problems is sent to the PMS 130, this means that the vehicle 150 cannot be operated reliably or safely. In this case, the vehicle 150 is stopped. Ideally, and if possible, this occurs in a position in which the rest of the traffic in the parking installation 110 is not disrupted.

According to step S505, an emergency service or breakdown service is informed about the failure with a corresponding notification. In step S506, the driver 160 is also informed about the problem, the measures initiated by the PMS 130 and the progress in remedying the problem (for example "problem was remedied in situ", "vehicle had to be towed to the nearest workshop", etc.).

The invention claimed is:

1. A vehicle parking device comprising:

a parking apparatus configured to determine, at a start of a parking phase, a first route for a vehicle from an entry region of a parking installation to a currently available free parking space within the parking installation, and transmit corresponding movement instructions to a driving assistance system of the vehicle, and determine, at an end of the parking phase, a second route for the vehicle from the parking space to an exit region of the parking installation, and transmit corresponding movement instructions to the driving assistance system, wherein the determination of the first route and of the second route is according to a function of current traffic volume in the parking installation.

2. The device as claimed in claim 1 further comprising a sensor arrangement configured to carry out real-time monitoring of vehicles moving within the parking installation.

3. The device as claimed in claim 2, wherein the sensor arrangement is also configured to carry out real-time monitoring of parking spaces which are available within the parking installation.

4. The device as claimed in claim 1, wherein the parking apparatus is configured to communicate with the driving assistance system via wireless data communication.

5. The device as claimed in claim 1, wherein the parking apparatus is also configured to carry out wireless data communication with at least one operator.

6. The device as claimed in claim 1, wherein the parking apparatus is also configured to estimate a time of return of a driver to the parking installation.

7. The device as claimed in claim 1, wherein the parking apparatus is also configured to calculate costs for utilization of the parking installation.

8. A park assist method for a vehicle, comprising:

by a parking apparatus, transmitting to the vehicle instructions defining autonomous driving operations to maneuver the vehicle along a route, to an available parking space within a parking installation, planned as a function of current traffic volume due to other vehicles in the parking installation such that movement of the vehicle to the available parking space does not disrupt or slow down the other vehicles.

9. The method of claim 8 further comprising transmitting to the vehicle further instructions defining autonomous driving operations to maneuver the vehicle along a route from a parking space of the parking installation to an exit of the parking installation and planned as a function of the current traffic volume.

10. The method of claim 8, wherein the transmitting including wireless transmitting.

11. The method of claim 8 further comprising transmitting messages about the vehicle to a user of the vehicle.

12. A park assist system for a vehicle, comprising:

a parking apparatus configured to transmit to the vehicle instructions defining autonomous driving operations to maneuver the vehicle along a route, to an exit of a parking installation, planned as a function of current traffic volume due to other vehicles in the parking installation such that movement of the vehicle to the exit does not disrupt or slow down the other vehicles.

13. The system of claim 12, wherein the parking apparatus is further configured to transmit to the vehicle further instructions defining autonomous driving operations to maneuver the vehicle along a route from an entry of a parking installation to an available parking space within the parking installation and planned as a function of the current traffic volume.

14. The system of claim 12, wherein the parking apparatus is further configured to perform the transmitting wirelessly.

15. The system of claim 12, wherein the parking apparatus is further configured to transmit messages about the vehicle to a user of the vehicle.

* * * * *